United States Patent [19]

Sheldon

[11] 4,220,052
[45] Sep. 2, 1980

[54] PIN RETENTION BY INTERFERENCE FIT DIFFERENTIAL

[75] Inventor: Jerome F. Sheldon, Milwaukee, Wis.

[73] Assignee: Rexnord Inc., Milwaukee, Wis.

[21] Appl. No.: 42,395

[22] Filed: May 25, 1979

[51] Int. Cl.³ .............................................. F16G 13/06
[52] U.S. Cl. ...................................... 474/207; 59/84; 474/234
[58] Field of Search ............... 59/8, 10, 12, 35, 78, 59/84, 85, 90; 198/853; 74/245 C, 245 R, 245 LP, 245 P, 248, 249, 250 R, 250 C, 251 R, 251 C, 252, 254, 255 R, 258

[56] References Cited

U.S. PATENT DOCUMENTS

| 892,965 | 7/1908 | Sevcik | 74/251 R |
|---|---|---|---|
| 1,936,769 | 11/1933 | Olivet | 16/169 |
| 2,053,864 | 9/1936 | Cook | 16/161 |
| 2,162,042 | 6/1939 | Welser | 74/245 R |
| 3,036,695 | 5/1962 | Thuerman | 74/254 |
| 3,144,124 | 8/1964 | Hein | 74/251 R |
| 3,178,239 | 4/1965 | Zeller | 74/255 R |
| 3,646,752 | 3/1972 | Kampfer | 59/78 |

Primary Examiner—Francis S. Husar
Assistant Examiner—Gene P. Crosby

[57] ABSTRACT

The ends of the metal pins of a chain of balanced design are carried in the aligned bores of the chain link sidebars. The links are of an engineering plastic and the ends of each pin are deliberately fitted differently in the one and the other bores of the two sidebars such that cyclic loading as in chain operation causes the pin to "walk" in the direction of the other bore. Abutment means prevents movement of the pin in that direction and the pin is thereby self-securing but can be readily removed in the other direction when required.

11 Claims, 6 Drawing Figures

PIN RETENTION BY INTERFERENCE FIT DIFFERENTIAL

BACKGROUND OF THE INVENTION

The subject invention derives from the difficulties encountered in finding the average interference fit which will provide the most acceptable pin securement. This effort included knurling pins and molding links of various manufacturing tolerances, assembling the same and actual operation of such chains over extended periods until some numbers of pins of each test chain had worked their way outwardly. It should be of particular note that some pins of a given chain would creep in one direction and others in the opposite direction. However, on one occasion, all the pins of a chain which had worked their way out of position did so consistently. The factors responsible for the occurrence were ascertained and reproduced such that with suitable abutment means, the pins were made to be self-securing.

In U.S. Pat. No. 3,036,695 one end of each pin of a piano hinge type conveyor chain is provided with a spiral knurl of such twist that articulation of the chain over a drive sprocket tends to rotate and move the pin in the direction of an abutment which is provided whereby each pin is thereby self-securing but is readily removable in the opposite direction, i.e. away from the abutment. The invention of U.S. Pat. No. 3,306,695 uniquely provides the desired dependable securement of the pin. However, the direction is reversed if the chain should be turned over. While the present invention also provides a pin which is self-securing, the present invention is entirely distinguishable over the invention of U.S. Pat. No. 3,306,695 including by reason of the fact that the chain may be turned over. It will be seen that the principle of operation of the present invention is entirely different from that of U.S. Pat. No. 3,306,695. Also, the oscillation of the links relative to the pins is not a factor insofar as can be discerned. Unidirectional cyclic loading under test conditions will produce the same effect as operation under load over a drive sprocket.

SUMMARY OF THE INVENTION

A chain link has spaced sidebars provided with aligned bores and a round pin which has one end fitted in one bore and has its other end fitted in the other bore. The sidebars are of a material having a relatively low elastic modulus. The pin is subject to bending as a centrally loaded beam and the effect is such that each end of the pin has a tendency to creep in one direction or the other. The pin and link have cooperating abutment means which prevents movement of the pin in the direction from said one bore toward the other bore. The fit in the one bore is arranged so that the pin has a tendency to move toward the other bore. The fit in the other bore is such that its tendency to move in either direction is negligible whereby with such abutment the pin is held in place by its own bending and unbending action.

DESCRIPTION OF THE INVENTION AND OF THE PREFERRED EMBODIMENT

Figure 4:
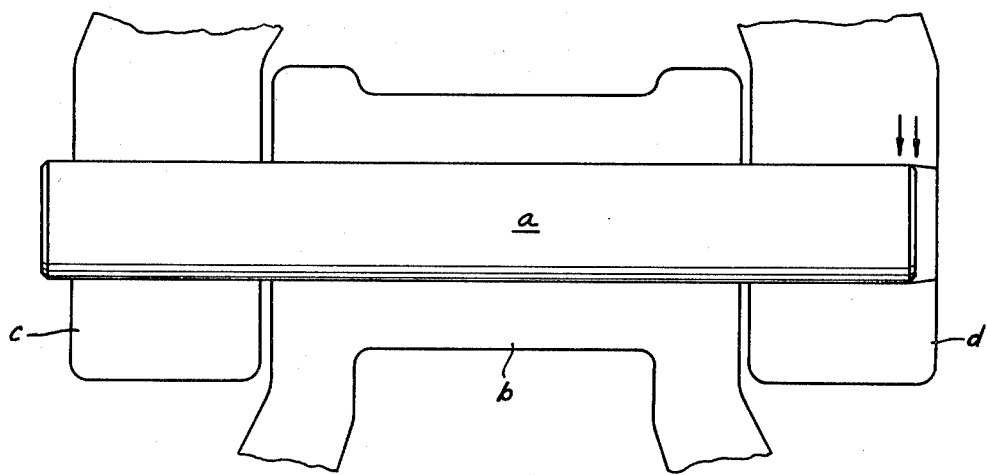
FIGS. 4-6 illustrate the principle of the invention.
Figure 5:
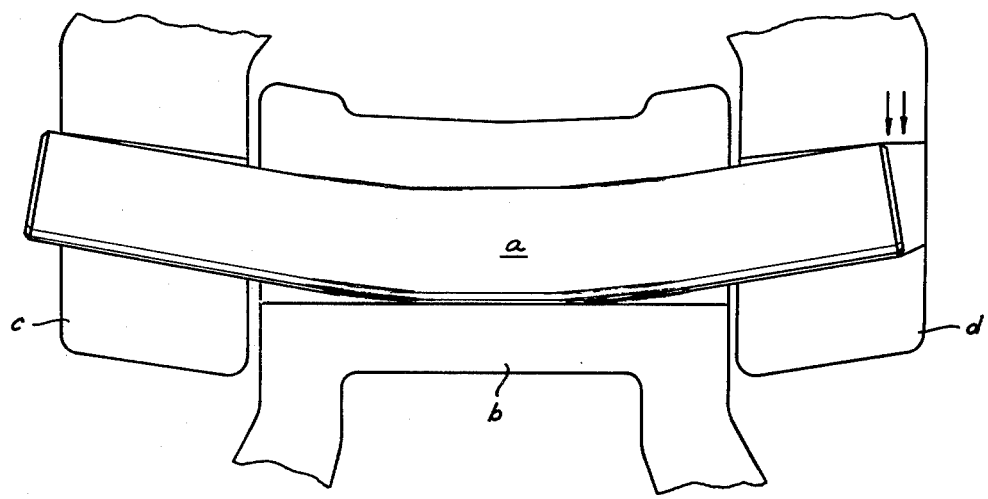
Figure 6:
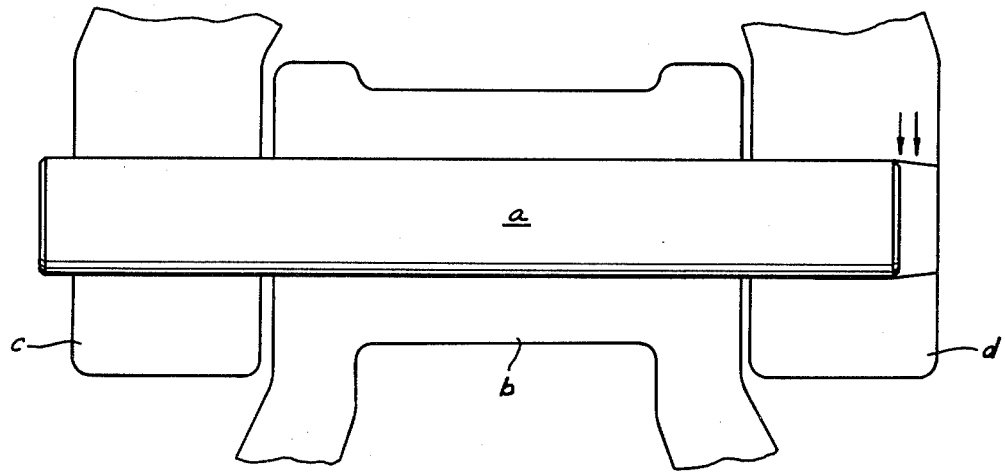

In each of FIGS. 4-6, the round, steel pin a is turnable in the barrel b of one of the links, shown in part. The ends of pin a are supported in the bores of the sidebars c and d of the other link, shown in part. Both ends of the pin have a similarly tight or interference fit. However, the end of pin a at the right is recessed in the bore of sidebar d whereas the end of pin a at the left projects from the bore of sidebar c.

If the links are of metal, the ends of pin a would be generally well secured in the bores of sidebars c and d. However, if the links are, for example, of a thermoplastic material having a relatively low modulus of elasticity (to the extent allowable in a chain) chain operation will generally cause the pin to creep or walk to the left as shown because of the forces which are repeatedly applied to the pin and links in normal chain operation.

A sequence of events as follows is repeated each time the illustrated chain joint enters and leaves the load carrying run of the chain. The reference to the front and rear sides of the pin has reference to the directions of pin loading at its ends. As shown, the reference arrows are at the rear side of the pin. When pin a is loaded, it functions as a centrally loaded beam as shown in FIG. 5 and bends to some degree although imperceptibly. The bending causes the rear sides of the pin (at its ends) to shift toward the centerline of the chain. The rear sides of the pin are relatively unloaded and permit such shifting whereas the front sides of the pin are pressed against the bore surfaces of sidebars c and d and remain in place. Additionally, the front corner of the end of the pin at right tends to dig into the bore of sidebar d and prevents at least any possibility of pin motion to the right, as shown. When pin a is again unloaded as in FIG. 6, the pin straightens and its ends are again "regripped" by both sidebars c and d.

However, the rear corner of the end of the pin at the right tends to dig into the bore surface of the sidebar d and tends to prevent the return of the pin to the position it had before bending. As a consequence, pin a tends to assume a new position as shown in FIG. 6. As stated, this sequence is repeated each time the chain joint enters and leaves the carrying run of the chain and the cumulative effect is to cause the pin to creep or walk to the left, as shown, in the course of some period of chain operation. The movement of the pin to the left is dependent upon a press fit of the end of the pin at the right in sidebar d. According to the present invention, such movement may be further assured by either or both providing the right end portion of the pin with many such front and rear corners, as by knurling, and providing the left end portion of the pin with a lesser or the minimum required interference fit in sidebar c.

Figure 1:
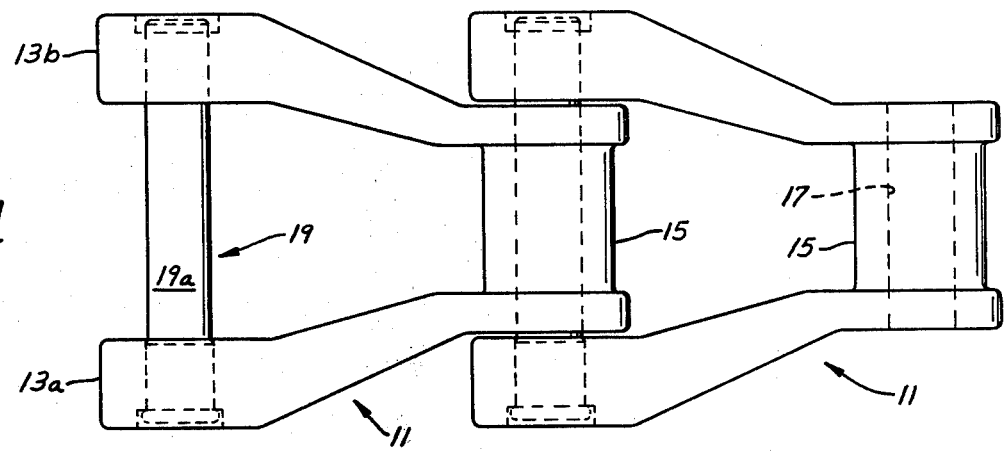
FIG. 1 shows two links of a chain in plan and their connecting pins.
Figure 2:
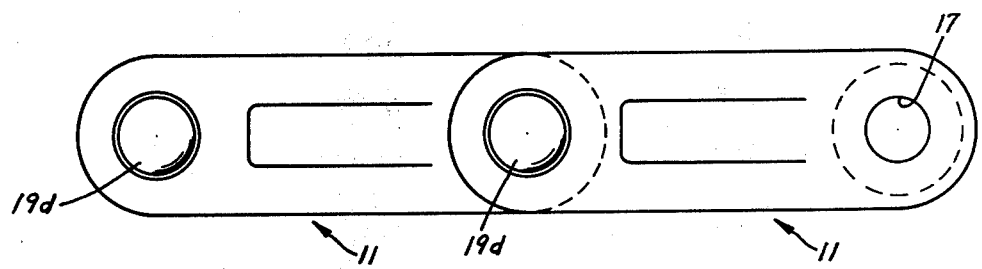
FIG. 2 is a side view of the two links shown in FIG. 1.
Figure 3:
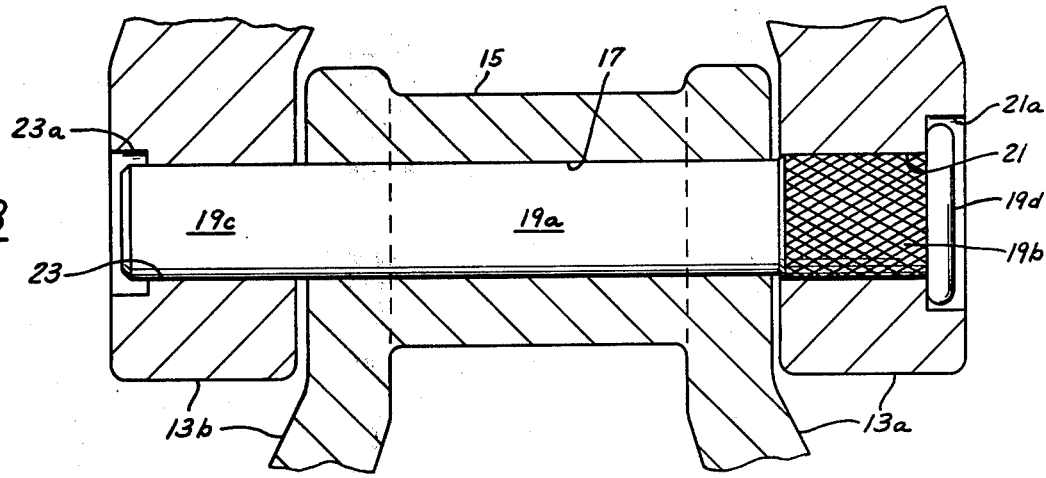
FIG. 3 is an enlarged sectional view of one chain joint and shows the pin in detail.

The links shown in FIGS. 1–3 of the drawings are pintle links for an endless chain which is intended to operate over a drive and a driven sprocket, now shown. Each link 11 includes the sidebars 13a and 13b having ends which are connected to the barrel 15 integrally formed therewith. Barrel 15 is molded with the straight, through bore 17 in which the shank 19a of pin 19 is turnable. The divergent ends of sidebars 13a and 13b are provided with the aligned bores 21 and 23 respectively and in which the ends 19b and 19c of pin 19 are supported.

The pin 19 may be of any suitable construction. It is a cut length of drawn carbon steel or stainless steel wire and is ground or formed to the required diameter. End 19b is enlarged by diamond or cross-knurling in a known manner and according to the present invention, end 19b is also cold headed to provide the round head 19d. Bore 21 includes the counterbore 21a to receive head 19d. The diameter of bore 21 is slightly greater than the diameter of shank 19a and end 19b of pin 19.

The larger diameter of bore 21 respecting the shank 19a and end 19c of pin 19 is to facilitate endwise insertion and withdrawal of the pin therethrough. It should be understood that the principal purpose of diamond or cross-knurling end 19b of pin 19 is to provide an enlarged end which will have a press fit in bore 21 and provide a large number of both front and rear corners which will dig into the bore surfaces of the sidebars. No rotation orientation of the pin is required when inserting the pin and the knurling also provides any necessary securement of the pin against turning in the bores of the sidebars. The end face or shoulder of counterbore 21a and head 19d provide the cooperating abutment means which prevents the pin from being displaced in the direction which is from the bore 21 and toward bore 23, as will be described. Any type of suitable abutment means may be provided, of course.

Pin securement is provided by the tendency of the pin to creep in the direction which keeps it in abutting engagement with the link as is provided for. As indicated, this creep consists of incremental displacements of the front and rear sides of the pin which occur with each bending and straightening of the pin.

The elasticity of the material of the links and the stiffness of the pins are thus factors which are important to the operation of the present invention. The limits of these factors cannot be practicably provided. In the described embodiment of the invention the material of the links has a Young's modulus of elasticity in tension of in the order of $500,000 \times 10^3$ psi. The pins have a longitudinal Young's modulus of elasticity of in the order of $28 \times 10^6$ psi and a ratio of length to diameter of 6:1 or more. That is, for a balanced design, the pins may be of somewhat smaller diameter than would be appropriate to a dimensionally similar chain of steel construction because the tensile strength of the thermoplastic is less than that of steel. Also, the somewhat narrower pin allows a greater sectional area of the links at the bores for the pin. The indication here is that bending of the chain is not only utilized but may be allowed to advantage and even provided for.

Generally, any type of diamond or cross-knurling may be employed. If the knurling has sharp upset edges, they preferably should be in the direction of the head 19d. A spiral knurl as in U.S. Pat. No. 3,306,695 should not be used for the reasons indicated.

The press fit of the knurled portion 19b of pin 19 in bore 21 relative to the fit of end 19c in bore 23 is also a factor which is important to the present invention. In the embodiment of the invention of FIGS. 1–3, pin 19 is about 7/16 inches in diameter (10.93 mm), the interference fit in bore 23 is about 0.004–0.005 inches (0.1 mm–0.125 mm) and the interference fit in bore 21 is about 0.011–0.013 inches (0.275 mm–0.325 mm). Very generally the interference fit in bore 21 is about one half that of the interference fit of pin 19 in bore 23. These fits refer of course to the differences in the diameters of the respective bores and parts of the pin.

A further improvement may be provided by the counterbore 21a which exposes the end of pin 19 such that it projects from bore 21. This improvement however should not be critical, but would somewhat lessen the tendency of the pin to be pushed toward bore 23, if there is any such tendency.

The present invention is not limited to pintle chain but does require that the pin be bent as a centrally loaded beam in normal chain service in order to assure that the pin is self-securing.

I claim:

1. A chain link having spaced sidebars provided with aligned bores and a round pin having one end which is press fitted in one bore and having its other end supported in the other bore with a moderate fit, the pin and link having cooperating abutment means which prevent movement of the pin in the direction from said one bore toward said other, the beam strength of the pin and the elastic modulus of the link being such that in chain operation such as over a drive sprocket the pins are subject to cyclic bending, specifically as centrally loaded beams and the links are subject to cyclical tensile stresses which cause the pins to move in said direction whereby the pins are in effect self-securing.

2. A chain link having spaced sidebars provided with aligned bores and a round pin having one end press-fitted in one bore and having its other end supported in the other bore with a relatively loose fit, the pin and link having cooperating abutments means which prevents movement of the pin in the direction from said one bore toward the other bore, the beam strength of the pin and the elastic modulus of the link being such that the cyclic loading and unloading of the pin, specifically as a centrally loaded beam, and coincident periodic changes in the compression profiles of the pin fits in the link bores due to the cyclic tensile loading of the link, causes the pin to move or be moved in said direction whereby with such abutment means the pin is in effect self-securing.

3. A chain comprising a series of links and interconnecting pins, each pin being turnable in one end of one of two adjacent links, the other of said two links having sidebars provided with aligned bores, one end of a pin being supported in said one of said bores and the other end of the pin being supported in said other of said bores, said sidebars being of a material having a relatively low elastic modulus, said pins being relatively bendable as a centrally loaded beam under normal chain loading, the fit of said one end of the pin in the one bore being such that said one end has a tendency to creep in the direction which is toward the other bore, said other end of the pin being such that said other end has a negligible tendency to creep in either direction, said pin and one of the sidebars having cooperating abutment means which prevents movement of the pin in said direction whereby the pin is self-securing but may be readily removed from the bores in the other direction.

4. The chain link and pin of claim 1 wherein the cooperating abutment means comprises (1) a head on the said one end of the pin and (2) the annular portion of the one sidebar which defines one end of said one bore and which is engageable by said head of the pin.

5. The combination of claim 1 wherein the chain link is of a molded acetal resin construction.

6. The combination of claim 5 wherein the pin is of stainless steel.

7. The combination of claim 5 wherein the one end of the round pin is nominally larger than the rest of the pin.

8. The combination of claim 7 wherein the one bore of the chain link is nominally larger than the other bore.

9. The combination of claim 5 wherein the one end of the round pin is knurled.

10. The combination of claim 7 wherein the one bore of the chain link is nominally larger than the other bore.

11. The chain link and pin of claim 4 wherein the said annular portion of the sidebar is recessed such that the head of the pin is substantially flush with the side of the said sidebar.

* * * * *

Disclaimer 4,220,052.—*Jerome F. Sheldon*, Milwaukee, Wis. PIN RETENTION BY INTERFERENCE FIT DIFFERENTIAL. Patent dated Sept. 2, 1980. Disclaimer filed June 14, 1982, by the assignee, *Rexnord, Inc.*

Hereby enters this disclaimer to all claims of said patent.

[*Official Gazette August 24, 1982.*]